US011189876B2

(12) United States Patent
Lee et al.

(10) Patent No.: US 11,189,876 B2
(45) Date of Patent: Nov. 30, 2021

(54) BATTERY MODULE HAVING GUIDE COUPLING STRUCTURE AND BATTERY PACK COMPRISING SAME

(71) Applicant: LG CHEM, LTD., Seoul (KR)

(72) Inventors: Kwang-Bae Lee, Daejeon (KR); Seog-Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 192 days.

(21) Appl. No.: 16/477,716

(22) PCT Filed: Aug. 21, 2018

(86) PCT No.: PCT/KR2018/009611
§ 371 (c)(1),
(2) Date: Jul. 12, 2019

(87) PCT Pub. No.: WO2019/059538
PCT Pub. Date: Mar. 28, 2019

(65) Prior Publication Data
US 2019/0372069 A1    Dec. 5, 2019

(30) Foreign Application Priority Data
Sep. 20, 2017    (KR) .................. 10-2017-0121278

(51) Int. Cl.
*H01M 50/20* (2021.01)
*H01M 50/502* (2021.01)
(Continued)

(52) U.S. Cl.
CPC .......... *H01M 50/20* (2021.01); *H01M 50/502* (2021.01); *H01M 50/543* (2021.01);
(Continued)

(58) Field of Classification Search
CPC .. H01M 50/20; H01M 50/502; H01M 50/543; H01M 2220/20; B60L 50/64;
(Continued)

(56) References Cited

U.S. PATENT DOCUMENTS

2005/0079408 A1    4/2005  Hirano
2011/0293986 A1   12/2011  Kozu
(Continued)

FOREIGN PATENT DOCUMENTS

CN    105226211 A    1/2016
CN    106129287 A   11/2016
(Continued)

OTHER PUBLICATIONS

KR20140008123A Jung Espacenet translation (Year: 2014).*
(Continued)

*Primary Examiner* — Cynthia H Kelly
*Assistant Examiner* — Kirsten B Tysl
(74) *Attorney, Agent, or Firm* — Birch, Stewart, Kolasch & Birch, LLP

(57) ABSTRACT

A battery module including a plurality of cylindrical battery cells; a module housing having an accommodating part; a bus bar electronically connected to electrode terminals of at least two cylindrical battery cell; and a current collecting plate contacting with a current collecting plate of an adjacent battery module and being electronically connected to a plurality of cylindrical battery cells of the adjacent battery module, wherein a guide coupling structure, including a coupling protrusion and a guiding groove, guides an arrangement location of the adjacent battery module on an outer surface of an external wall of the module housing.

18 Claims, 11 Drawing Sheets

(51) Int. Cl.
*H01M 50/543* (2021.01)
*B60L 50/64* (2019.01)
*B60K 6/28* (2007.10)

(52) U.S. Cl.
CPC .............. *B60K 6/28* (2013.01); *B60L 50/64* (2019.02); *B60Y 2200/91* (2013.01); *B60Y 2200/92* (2013.01); *B60Y 2400/112* (2013.01); *H01M 2220/20* (2013.01)

(58) Field of Classification Search
CPC .. B60K 6/28; B60Y 2200/91; B60Y 2200/92; B60Y 2400/112
See application file for complete search history.

(56) References Cited

U.S. PATENT DOCUMENTS

| | | |
|---|---|---|
| 2011/0293998 A1 | 12/2011 | Sato et al. |
| 2014/0072859 A1 | 3/2014 | Won et al. |
| 2014/0127540 A1 | 5/2014 | Min |
| 2015/0050538 A1 | 2/2015 | Choi |
| 2015/0325824 A1 | 11/2015 | Hasegawa et al. |
| 2016/0111760 A1 | 4/2016 | Arai |
| 2016/0181579 A1 | 6/2016 | Geshi et al. |
| 2017/0200926 A1* | 7/2017 | Motokawa .......... H01M 10/425 |

FOREIGN PATENT DOCUMENTS

| | | |
|---|---|---|
| JP | 2003-162993 A | 6/2003 |
| JP | 2007-234369 A | 9/2007 |
| JP | 2014-197452 A | 10/2014 |
| JP | 2016-81836 A | 5/2016 |
| KR | 10-2011-0084959 A | 7/2011 |
| KR | 10-1297261 B1 | 8/2013 |
| KR | 10-2014-0008123 A | 1/2014 |
| KR | 10-1382297 B1 | 4/2014 |
| KR | 10-2015-0019705 A | 2/2015 |
| KR | 10-2016-0020645 A | 2/2016 |
| KR | 10-2016-0121817 A | 10/2016 |
| KR | 10-2017-0042407 A | 4/2017 |
| WO | WO 2014/119287 A1 | 8/2014 |
| WO | WO 2015/105335 A1 | 7/2015 |

OTHER PUBLICATIONS

KR20160121817A Yang Espacenet translation (Year: 2016).*
CN105226211A Cheonnan Espacenet translation (Year: 2015).*
International Search Report issued in PCT/KR2018/009611 (PCT/ISA/210), dated Dec. 5, 2018.
English machine translation of KR 10-2014-0008123 A, published Jan. 21, 2014.
Extended European Search Report dated Jun. 23, 2020 corresponding EP Patent Application No. 18858968.3.
Partial Supplementary European Search Report dated Mar. 24, 2020 in regard to the European Patent Application No. 18858968.3.

* cited by examiner

BATTERY MODULE HAVING GUIDE COUPLING STRUCTURE AND BATTERY PACK COMPRISING SAME

TECHNICAL FIELD

The present invention relates to a battery module accommodating more than two cylindrical battery cells, more specifically a battery module having improved efficiency in expanding by connecting a plurality of battery modules and a battery pack including the same.

The present application claims priority to Korean patent application No. 10-2017-0121278 filed in the Republic of Korea on Sep. 20, 2017 and the disclosures of the specification and drawings are incorporated herein by reference.

BACKGROUND ART

The current commercialized secondary batteries include, Nickel-Cadmium battery, Nickel-Hydrogen battery, Nickel-Zinc battery, Lithium secondary battery and so on. Among them, the Lithium secondary battery does not show memory effect in comparison to Nickel secondary batteries, may be repeatedly charged and discharged, has a very low self-discharge rate and high energy density, and thus is widely used in the art.

The Lithium secondary battery, depending on the shape of battery case which accommodates a positive electrode/a separator/a negative electrode, may be provided as a cylindrical battery, a prismatic battery and a pouch type battery, and in accordance with miniaturization tendency of devices, demand for the prismatic battery and the pouch type battery, which are suitable to the miniaturization tendency, is largely increasing.

Conventionally, the prismatic battery is manufactured by inserting a jelly-roll or stack type electrode assembly, comprising a positive electrode/a separator/a negative electrode, into a metal prismatic battery case, covering an opened top end with a top-cap, injecting an electrolyte through an electrolyte injection hole of the top cap and proceeding a sealing process.

Also, the pouch type battery is manufactured by inserting the electrode assembly into a pouch case made of a laminated sheet and thermally sealing an outer circumferential surface.

Meanwhile, with the diversification of devices to which the batteries above apply, the shape of batteries as produced are changing from its original rectangular shape to variety of different shapes.

Recently, in order to find a solution to overcome instability of power production by using renewable energy, there is increasing interest for an energy storage apparatus. The energy storage apparatus, where the power production amount is unstable (depending on a climate change), may store surplus power so that there is no shortage in the overall power amount.

The energy storage apparatus has a plurality of battery modules storing electricity, and a related means that effectively manages electricity energy stored in the battery modules.

Further, constructing the energy storage apparatus requires a job that arranges, connects and expands a plurality of battery modules. However, in the conventional art, a lot of components should be used in electrically connecting and uniformly arranging a plurality of battery modules, and due to complexity of installation of the battery module, the installation task requires a lot of time. Especially, when constructing a large-scaled energy storage apparatus, high costs and a lot of time required to install a plurality of battery modules caused the problem to deepen.

DISCLOSURE

Technical Problem

The present invention has been designed to solve the problems of the prior art by providing a battery module with increased efficiency in the installation task of connecting and expanding a plurality of battery modules, and includes a battery pack comprising the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present invention, to achieve the purpose of the invention, there is provided a plurality of battery modules electronically connected to each other, each battery module comprising: a plurality of cylindrical battery cells, each battery cell comprising an upper part, a lower part, a first electrode terminal formed on the upper part and a second electrode terminal formed on the lower part; a module housing including a receiving portion having a plurality of hollow structures, wherein the plurality of cylindrical battery cells are provided in the plurality of hollow structures; a bus bar including a first surface and a second surface opposite to the first surface, the bus bar contacting and electrically connected to the first or second electrode terminals of at least two cylindrical battery cells among the plurality of cylindrical battery cells through the first surface of the bus bar; and a current collecting plate including a first surface and a second surface opposite to the first surface, wherein the current collecting plate is electrically connected to the plurality of cylindrical battery cells by contacting the second surface of the bus bar, and through at least a portion of the second surface of the current collecting plate, is electrically connected to the plurality of cylindrical battery cells of an adjacent battery module among the plurality of battery modules by contacting another current collecting plate.

Here, each module housing may comprise an external wall to form an internal space therein, and a guide coupling structure, having a coupling protrusion and a guiding groove, is formed on an outer surface of the external wall of the respective module housing so as to guide an arrangement location of the adjacent battery module.

Each coupling protrusion may be protruded and extended from the outer surface of the respective external wall and each guiding groove may be inwardly recessed from the outer surface of the respective external wall, and wherein each guiding groove receives the coupling protrusion of the adjacent battery module.

Further, each module housing may comprise: an upper case including a first receiving part formed in a hollow structure and covering an outer surface of an upper part of the plurality of cylindrical battery cells; and a lower case coupled with the upper case and including a second receiving part formed in a hollow structure covering an outer surface of a lower part of the plurality of cylindrical battery cells.

Further, each upper case may have a first protrusion fastening part extended toward a first side from right and left outer surfaces of the respective external wall and includes a through hole into which a first fastening bolt is inserted.

Each lower case may have a second protrusion fastening part extended toward a second side from right and left outer surfaces of the external wall and includes a through hole into which a second fastening bolt is inserted.

The through hole of the second protrusion fastening part communicates with the through hole of the first protrusion fastening part of the upper case of the adjacent battery module via the second fastening bolt.

The first receiving part of each upper case may comprise a convex part protruded toward an internal direction on an interior surface of the first receiving part, the convex part opposing the plurality of cylindrical battery cells and fixing the plurality of cylindrical battery cells by applying pressure to the plurality of cylindrical battery cells.

The first receiving part of each upper case may comprise an incision part cut off from an upper end to a predetermined location of the hollow structure in the lower direction and each convex part may be formed on an inside surface of a respective incision part.

The incision part may be correspondingly located with the incision part of the adjacent battery module, and the adjacent incision parts being separated by a predetermined distance.

Each bus bar may comprise: a body plate extended in an arrangement direction of the plurality of cylindrical battery cells and a terminal connection parts protruded and extended from a first end of the body plate, each terminal connection part contacting the first or second electrode terminals of a respective one of the plurality of battery cells.

The Each current collecting plate may comprise a first current collecting plate mounted on an upper part of the module housing, wherein the first current collecting plate is electrically connected to the first electrode terminal of the plurality of cylindrical battery cells of the respective battery module, and a second current collecting plate mounted on a lower part of the respective module housing, wherein the second current collecting plate is electrically connected to the second electrode terminal of the plurality of cylindrical battery cells of the respective battery module.

The first current collecting plate may comprise a first current collecting part contacting with an upper surface of the bus bar connected to the first electrode terminal of the plurality of cylindrical battery cells; and a contact receiving part extended toward a front direction from one end of the first current collecting part and having a stepped part in a lower direction.

The second current collecting plate may comprise a second current collecting part contacting with a lower surface of the bus bar connected to the second electrode terminal of the plurality of cylindrical battery cells; a vertical extension part vertically bent in an upper direction from a first end of the second current collecting part, the upper direction being perpendicular to the front direction; and a contact connection part placed in the contact receiving part of the first current collecting plate and bent and extended in a rear direction from an upper end of the vertical extension part, the rear direction being opposite to the front direction and the rear direction being perpendicular to the upper direction, wherein the contact connection part is electrically connected to the first current collecting plate.

At least one protrusion is formed in a lower direction on a lower surface of each contact receiving part, the lower direction being opposite to the upper direction, and at least one groove shaped corresponding to the protrusion of the contact receiving part is formed in the contact connection part.

A respective through hole is formed at a location corresponding to the coupling protrusion and the guiding groove in the vertical extension part, thereby the coupling protrusion of the guide coupling structure is penetrated into the through hole.

According to another aspect, to achieve the purpose of the invention, there is provided a battery pack comprising a plurality of battery modules according to the present invention, the battery modules being arranged in one direction.

According to another aspect, to achieve the purpose of the invention, there is provided a vehicle comprising a battery pack according to the present invention.

According to another aspect, to achieve the purpose of the invention, there is provided a plurality of battery modules electronically connected to each other, each battery module comprising: a plurality of cylindrical battery cells, each battery cell comprising an upper part, a lower part, a first electrode terminal formed on the upper part and a second electrode terminal formed on the lower part; a module housing including a receiving part having a plurality of hollow structures, wherein the plurality of cylindrical battery cells are provided in the plurality of hollow structures; a bus bar including a first surface and a second surface opposite to the first surface, the bus bar contacting and electrically connected to the first or second electrode terminals of at least two cylindrical battery cells among the plurality of cylindrical battery cells through the first surface of the bus bar; a current collecting plate including a first surface and a second surface opposite to the first surface, wherein the current collecting plate is electrically connected, via the first surface of the current collecting plate, to the plurality of cylindrical battery cells by contacting the second surface of the bus bar, and through at least a portion of the second surface of the current collecting plate, is electrically connected to the plurality of cylindrical battery cells of an adjacent battery module among the plurality of battery modules by contacting the current collecting plate of the adjacent battery module; an insulation plate contacting an one side outer surface of the external wall of the module housing; a supporting bar provided in the insulation plate and protruded in upper and lower directions from an outer circumference of the insulation plate; and a fastening member fastening the current collecting plate with the supporting bar.

Each module housing may comprise an external wall to form an internal space, and a guide coupling structure, having a coupling protrusion and a guiding groove, is formed on an outer surface of the external wall of each module housing so as to guide an arrangement location of the adjacent battery module.

A recessed groove, inwardly recessed and extended in the upper direction and the lower direction, is formed on an one side outer surface of the external wall of each module housing, and the respective supporting bar is inserted and received into the recessed groove.

Advantageous Effects

According to one aspect of the present invention, even without an extra member, one battery module may be easily arranged at an exact location in reference to another battery module through the guide coupling structure of the module housing. As such, cost and time required for connecting and expanding a plurality of battery modules may be effectively saved.

According to another aspect of the present invention, a stopper structure formed in the receiving part of the module housing may prevent the cylindrical battery cell accommodated therein from being pulled out and restrict moving of the cylindrical battery cell in the upward direction. As a result, the electrical disconnection between the cylindrical battery cell and the bus bar may be prevented beforehand.

According to another aspect of the present invention, the terminal connection part of the bus bar, electronically in contact and connected to the electrode terminal of the cylindrical battery cell, may be divided in two branches. Thus, when welding the terminal connection part and the electrode terminal each other, heat conductivity needed to provide heat for welding may effectively be increased by the gap of the branch structure, thereby decreasing the welding time and increase reliability of the welding.

According to another aspect of the present invention, through the coupling structure between the protrusion of the contact connection part of the second current collecting plate and the groove of the contact receiving part of the first current collecting plate, the contact connection part of the second current collecting plate may easily settle on the contact receiving part of the first current collecting plate, and by increasing the contact surface, the electrical resistance may be effectively reduced while improving the reliability of the electrical connection.

According to another aspect of the present invention, the convex part of the first receiving part, formed to pressurize the outer surface of the cylindrical battery cell, may reduce a bad connection between the cylindrical battery cell and the bus bar due to an external shock that causes a vibration or a movement of the cylindrical battery cell, thereby effectively reducing the damage of the cylindrical battery cell.

According to another aspect of the present invention, it is possible to stack a plurality of other battery modules on a plurality of battery modules, thereby to constitute various stack structures, which results in saving additional production costs when changing the battery pack's design.

DESCRIPTION OF DRAWINGS

The accompanying drawings illustrate a preferred embodiment of the present invention and together with the foregoing disclosure, serve to provide further understanding of the technical features of the present invention, and thus, the present invention is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
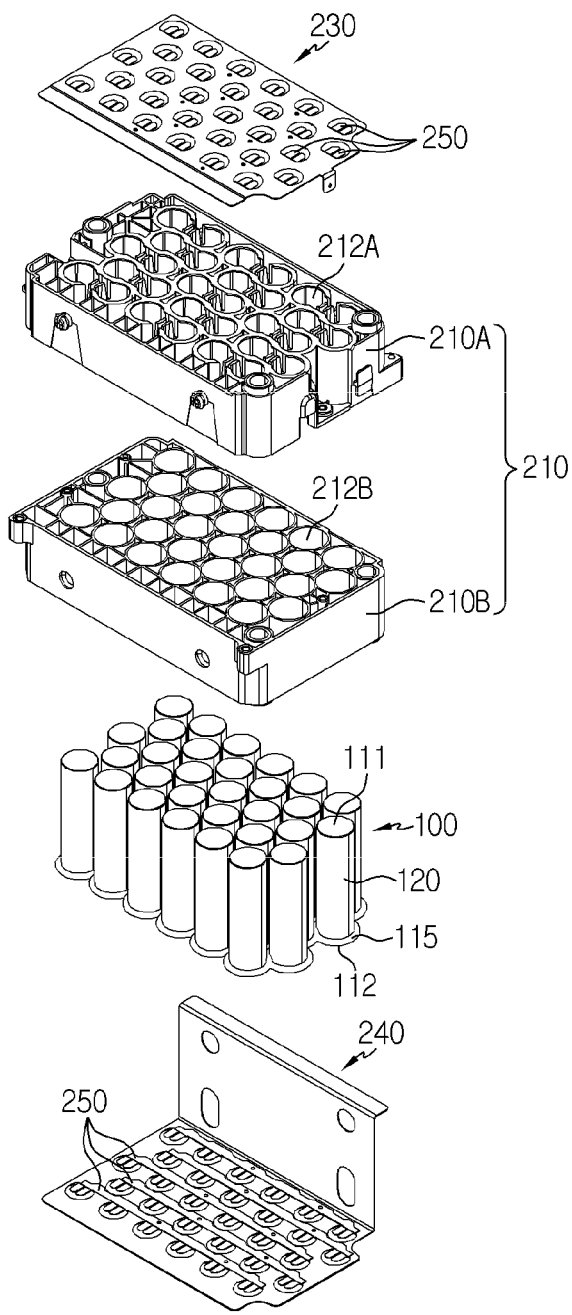
FIG. 1 is an exploded perspective view of a battery module according to one embodiment of the present invention, which shows separated configurations of the battery module.
Figure 2:
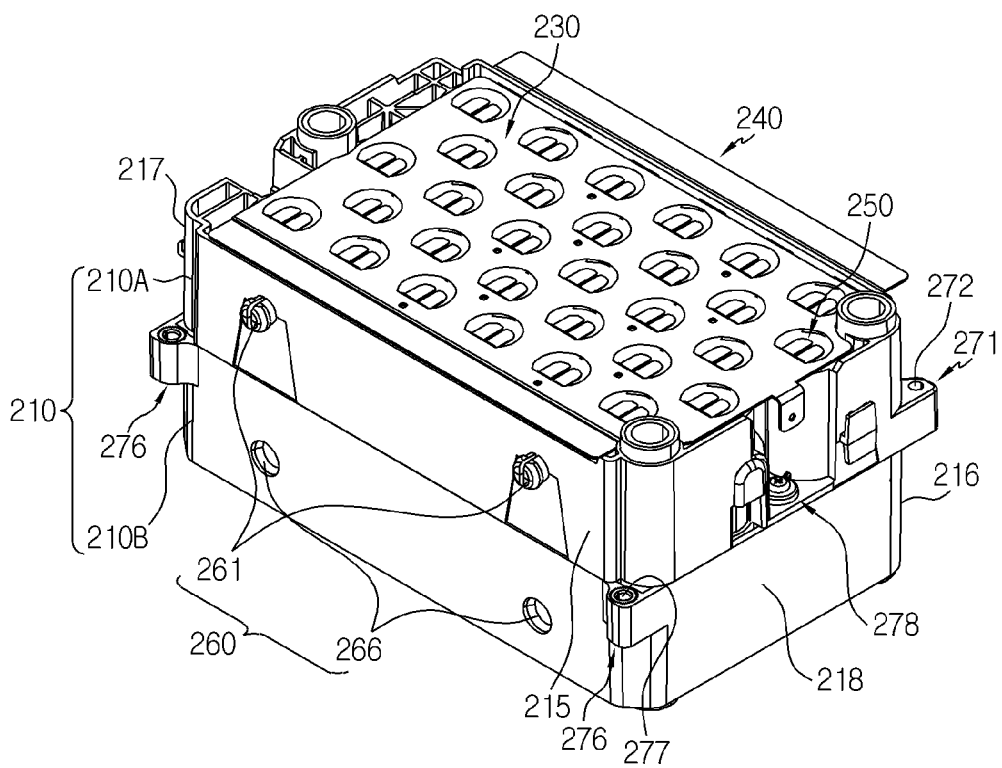
FIG. 2 is a perspective view schematically showing a front view of the battery module according to one embodiment of the present invention.
Figure 3:
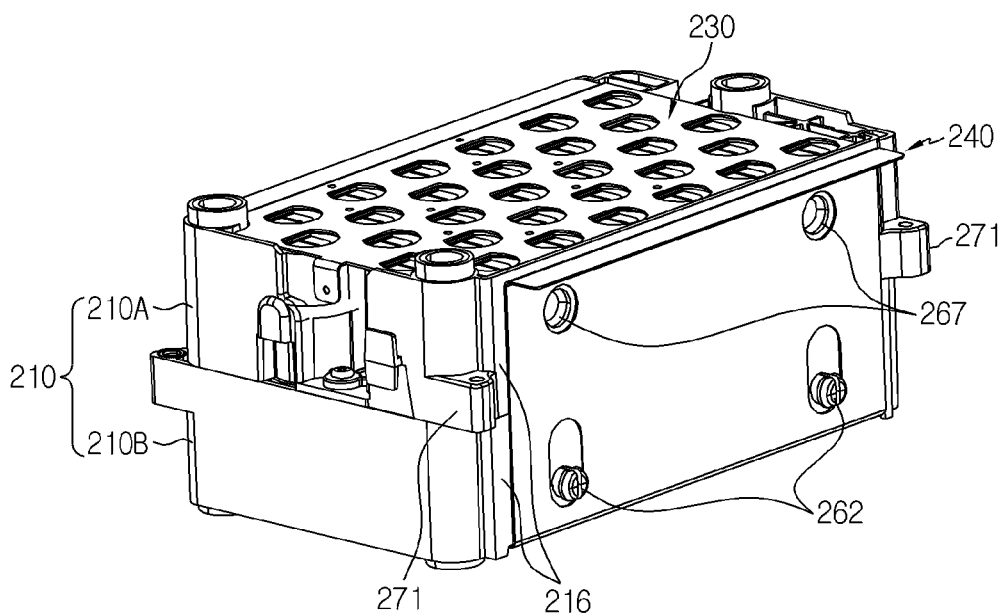
FIG. 3 is a perspective view schematically showing a rear view of the battery module according to one embodiment of the present invention.

FIG. 1 is an exploded perspective view of a battery module according to one embodiment of the present invention, which shows separated configurations of the battery module. FIG. 2 is a perspective view schematically showing a front view of the battery module according to one embodiment of the present invention. FIG. 3 is a perspective view schematically showing a rear view of the battery module according to one embodiment of the present invention.

Referring to FIGS. 1-3, a battery module (200) according to the present invention may include a cylindrical battery cell (100), a module housing (210), bus bars (250) and current collecting plates (230, 240).

Here, the cylindrical battery cell (100) may include a cylindrical battery can (120), and an electrode assembly (not shown) accommodated in the interior of the battery can (120).

Here, the battery can (120), include a material with high electrical conductivity, for example, aluminum or copper. An electrode terminal (111, 112) may be formed on each of the upper and lower part of the battery can (120). Specifically, the first electrode terminal (111) may be formed on the flat circular surface at the top of the battery can (120), and the second electrode terminal (112) may formed on the flat circular surface at the bottom of the battery can (120).

The electrode assembly (not shown) may be formed as a jelly-roll type winding structure by interposing a separator film between a positive electrode and a negative electrode. A positive electrode tap may be attached on the positive electrode (not shown) and connected to the first electrode terminal (111) of the upper part of the battery can (120). Also, a negative electrode tap may be attached on the negative electrode (not shown) and connected to the second electrode terminal (112) of the lower part of the battery can (120). However, this is one example and, thus the present invention is not restricted thereto. For example, in an alternative embodiment, a positive electrode tap may be attached on the positive electrode and connected to the second electrode terminal (112) of the lower part of the battery can (120), and a negative electrode tap may be attached on the negative electrode and connected to the first electrode terminal (111) of the upper part of the battery can (120).

On a circumferential portion of the second electrode terminal (112), a ring-shaped support member (115) may be formed to support a bottom surface. Thus, according to this embodiment, the cylindrical battery cell (100), even without an extra member, may stably maintain its straight standing state on the bottom surface.

Meanwhile, the module housing (210) may include a receiving part (212A, 212B) into which cylindrical battery cells (100) are inserted and accommodated therein. Specifically, the receiving part (212A, 212B) may be formed as a plurality of hollow structures which cover an outer surface of the cylindrical battery cells (100). At this time, the receiving part (212A, 212B) of the module housing (210) may have an electrically-insulating material. For example, the electrically-insulating material may be a high molecular plastic, including PVC (Polyvinyl chloride).

The module housing (210) may be made to form an internal space therein and have a first external wall (215), a second external wall (216), a third external wall (217) and a fourth external wall (218) in the front, back, left and right directions.

On at least one of the first external wall (215), the second external wall (216), the third external wall (217) and the fourth external wall (218), a guide coupling structure (260) including a coupling protrusion (261, 262) and a guiding groove (266, 267) may be formed to guide an arrangement location of another battery module (200).

Figure 4:
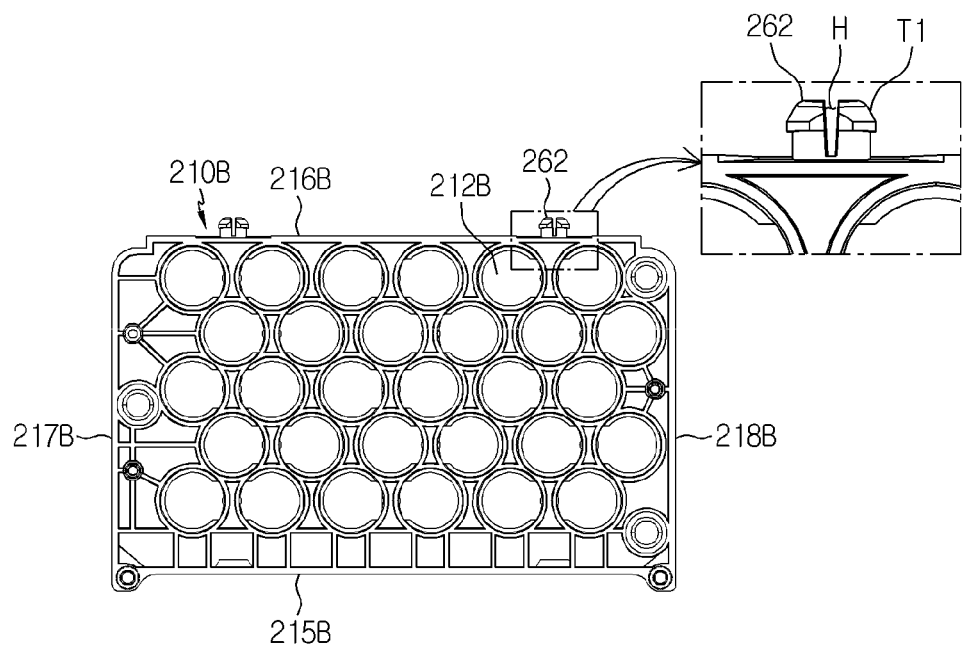
FIG. 4 is a top view of the battery module according to one embodiment of the present invention and a partially-enlarged view thereof for a portion of configurations, when looking from the top.

FIG. 4 is a top view of the battery module according to one embodiment of the present invention and a partially-enlarged view thereof for a portion of configurations, when looking from the top.

Referring to FIG. 4 along with FIGS. 2 and 3, the coupling protrusion (262) of the module housing (210) may have a structure protruded and extended from an outer surface of the second external wall (216B). Specifically, an upper portion of the coupling protrusion (262) of the module housing (210) in a protruding direction may be formed to be relatively thicker than a lower portion of the coupling protrusion (262) adjacent to the outer surface of the second external wall (216B).

The upper portion of the coupling protrusion (262) in the protruding direction may be formed to have a tapered structure (T1) in which the upper portion gradually increases in thickness toward the second external wall (216B).

The coupling protrusion (262) may be formed to have a gap (H), which divides the right and left of the upper portion based on a central axis.

The gap (H) may be recessed to have a predetermined depth in the direction from the upper portion of the coupling protrusion (262) to the external walls (215, 216, 217, 218). The recessed depth may extend to the outer surface of the second external wall (216B).

In FIG. 2, the coupling protrusion (261) of the module housing (210) also has the same configurations as the coupling protrusion (262) explained above and thus the explanation thereof will be omitted.

According to the embodiment of the present invention, the coupling protrusion (261, 262) of the module housing (210) may be inserted and fastened to the guiding groove (266, 267) and thus another battery module (Item 201 of FIG. 9) to be connected with the battery module (200) may be not only easily arranged but also fixed to the battery module (200), thereby not separated therefrom.

Referring back to FIG. 2 and FIG. 3 again, the guiding groove (266) may be recessed in an inward direction from an outer surface of the first external wall (215) such that the coupling protrusion (262) of another battery module (200) may be inserted thereto.

The guiding groove (267) may be inwardly recessed from an outer surface of the second external wall (216) such that the coupling protrusion (261) of another battery module (200) may be inserted thereto.

A jaw stopper (not shown) may be formed in the interior of the guiding groove (266, 267). The jaw stopper prevents the upper part of the coupling protrusion (261, 262), inserted into the guiding groove (266, 267), from pulling out therefrom.

Figure 5:
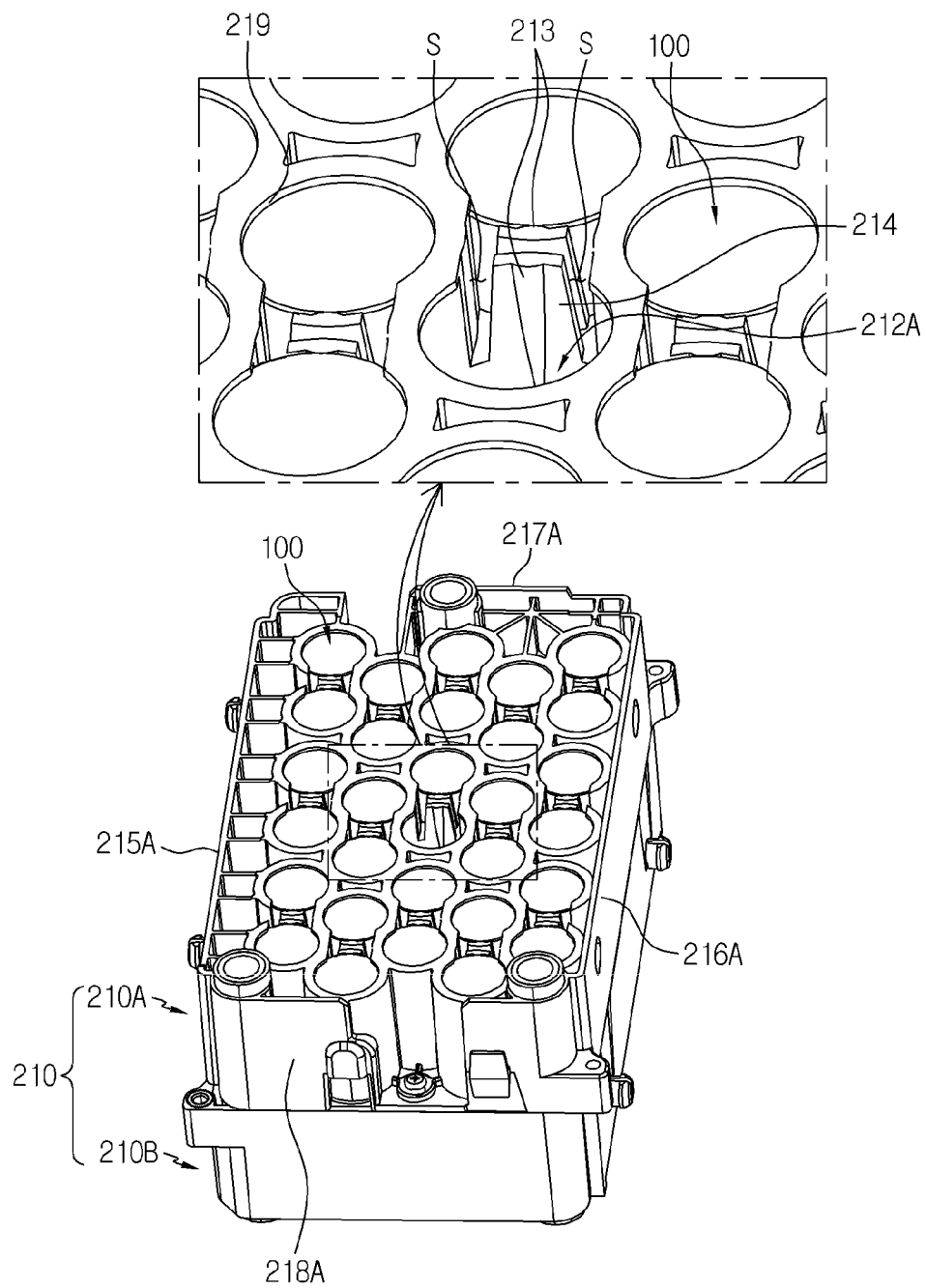
FIG. 5 is a perspective view and a partially-enlarged view of the battery module according to one embodiment of the present invention, schematically showing a portion of configurations.

FIG. 5 is a perspective view and a partially-enlarged view of the battery module according to one embodiment of the present invention, schematically showing a portion of configurations.

Referring to FIG. 5 along with FIGS. 2 to 4, the module housing (210) may include an upper case (210A) and a lower case (210B).

Specifically, the upper case (210A) may include a first external wall (215A), a second external wall (216A), a third external wall (217A) and a fourth external wall (218A). Also, the lower case (Item 210B in FIG. 4) may include a first external wall (215B), a second external wall (216B), a third external wall (217B) and a fourth external wall (218B).

For example, as shown in FIGS. 2 and 5, the upper case (210A) may be formed to have two coupling protrusions (261) on an outer surface of the first external wall (215A), which are inserted into two guiding grooves (267) formed on another module housing (210). Also, the lower case (210B) may have two guiding grooves (266) formed at a rear outer surface of the first external wall (215B) such that two coupling protrusions (262) formed on another module housing (210) may be inserted thereto.

Further, as shown in FIGS. 3 and 5, the upper case (210A) may be formed have two guiding grooves (267) on an outer surface of the second external wall (216A) such that two coupling protrusions (261) formed on another module housing (210) may be inserted thereto. Also, the lower case (210B) may have two coupling protrusions (262) formed on an outer surface of the second external wall (216B), which are inserted into two guiding grooves (266) formed on another module housing (210).

Referring to FIG. 4 with FIG. 5, the upper case (210A) may have a first receiving part (212A) formed as hollow structures, which covers the external surface of the upper part of the cylindrical battery cell.

The lower case (210B) may be fastened to the upper case (210A), and the lower case (210B) may have a second receiving part (212B) formed as hollow structures, which covers the external surface of the lower part of the cylindrical battery cell (100).

According to the embodiment of the present invention above, the module housing (210) may, using the first receiving part (212A) and the second receiving part (212B), cover and accommodate the upper and lower external surface of the cylindrical battery cell, thereby to protect the cylindrical battery cell (100) from external shock.

The upper end part of the first receiving part (212A) may have a stopper (219) formed at a top end of the first receiving part (212A) to prevent the top end of the cylindrical battery cell from moving over the upper part of the first receiving part (212A).

Specifically, the stopper (219) may have an arc-shaped structure with a narrower diameter than the diameter of the upper part of the cylindrical battery cell (100). The stopper (219) is formed to be extended from an upper end of the hollow structure toward a central axis of the hollow structure.

According to the embodiment of the present invention above, the cylindrical battery cell (100) accommodated in the interior of the module housing (210) may be effectively prevented from leaving outside by the stopper (219) and, the upward movement of the cylindrical battery cell (100) may be restricted so that a damage such as an electrical disconnection with a bus bar (250) may be prevented in advance.

Figure 6:
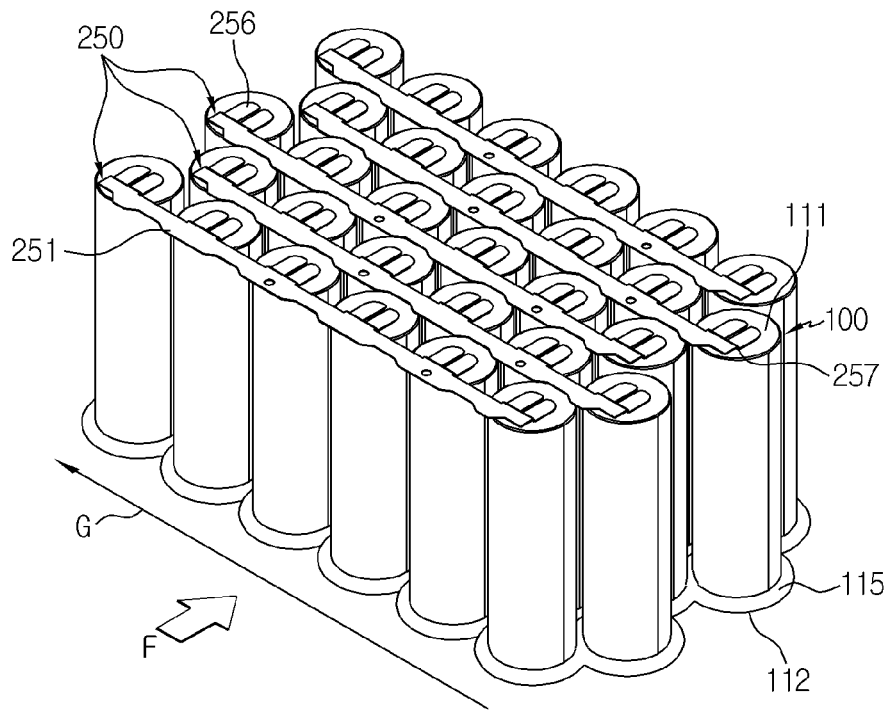
FIG. 6 is a perspective view of the battery module according to one embodiment of the present invention, schematically showing a portion of configurations of the battery module.

FIG. 6 is a perspective view of the battery module according to one embodiment of the present invention, schematically showing a partial configurations of the battery module.

Referring to FIG. 6, each bus bar (250) may include an electrically connected structure where one surface of each bus bar (250) is in contact with electrode terminals (111, 112) of at least two of a plurality of cylindrical battery cells (100).

Specifically, each bus bar (250) may include an electrically conductive material, for example, nickel.

Also, each bus bar (250) may include a body plate (251) and a terminal connection part (256).

Here, the body plate (251) may be extended in an arrangement direction (G) of the cylindrical battery cells (100). Also, the terminal connection part (256) may have a structure protruded from one side end of the body plate (251), thereby making contact with the electrode terminals (111, 112) of a plurality of cylindrical battery cells (100).

Specifically, the terminal connection part (256) may, when viewed from the F direction, be protruded and extended in a backward direction of the body plate (251).

The terminal connection part (256) may have a stepped portion (257) in a lower direction from the body plate (251). Thus, according to this configuration, the terminal connection part (256) of each bus bar (250) may easily form a contact surface with the electrode terminals (111,112) of the cylindrical battery cells (100) to increase reliability of the electrical connection.

Here, terms that represent directions, such as front, back, left, right, top, bottom, may be different depending on an observer's position or a position of a subject to be observed. However, for the convenience of explaining within the present disclosure, using the F direction as a reference for viewing the subject, the front, back, left, right, top and bottom directions will be distinguished and recited.

As shown in FIGS. 1 and 6, five bus bars (250) may be configured to electrically connect the first electrode terminals (111) of thirty cylindrical battery cells (100) in parallel along one direction (G). Similarly, five bus bars (250) may be configured to electrically connect the second electrode terminals (112) of the thirty cylindrical battery cells (100) in parallel along one direction (G).

The terminal connection part (256) may have a structure divided in two parts. Therefore, according to the embodiment of the present invention, a central area of the terminal connection part (256), which should be melt-bonded in a welding process, has a structure divided in two parts in the right and left direction so that a heat conductivity for heating in the welding may be effectively increased through the divided structure, and thus welding time may be reduced along with improved reliability.

Figure 7:
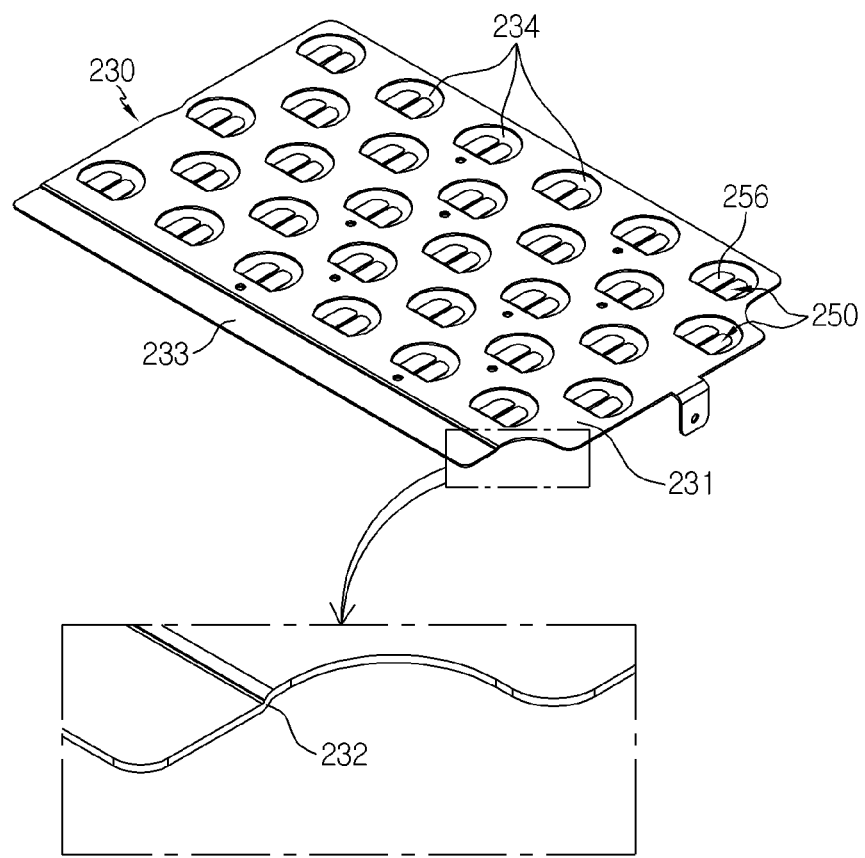
FIGS. 7 and 8 are perspective views of the battery module according to one embodiment of the present invention, schematically showing a portion of configurations of the battery module.
Figure 8:
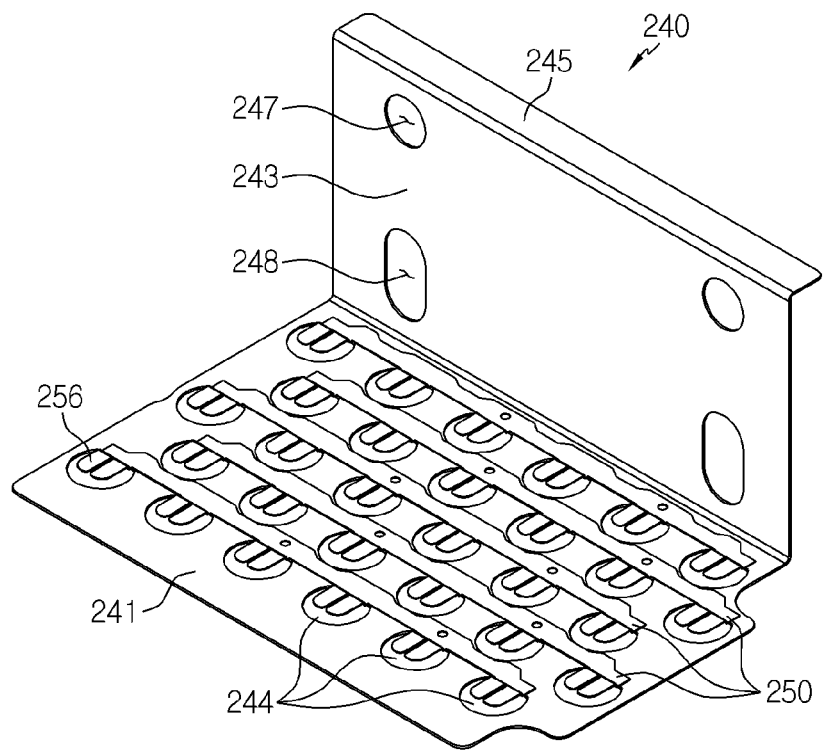

FIGS. 7 and 8 are perspective views of the battery module according to one embodiment of the present invention, schematically showing a portion of configurations of the battery module.

Referring to FIGS. 7 and 8 along with FIG. 1, a current collecting plate according to the present invention may include a first current collecting plate (230) and a second current collecting plate (240).

Specifically, the first current collecting plate (230) may include an electrically conductive material, for example, copper or aluminum, but may include any electrically conductive material known in the art.

Also, at least a portion of one surface of the first current collecting plate (230) may be partially contacted with the other side of the bus bar (250), which electrically connected with the first electrode terminal (111) of the cylindrical battery cell (100), thereby electrically connected to the cylindrical battery cell (100). In other words, the first current collecting plate (230) is mounted on the upper part of the module housing (210) form an electrically-connected structure with the first electrode terminal (111) of the cylindrical battery cell (100). At this moment, one surface of the first current collecting plate (230) and the other surface of the bus bar (250) may be coupled by laser welding.

The second current collecting plate (240) may include an electrically conductive material, for example, copper or aluminum.

Also, at least a portion of one surface of the second current collecting plate (240) may be partially contacted with the other side of the bus bar (250), which electrically connected with the second electrode terminal (112) of the cylindrical battery cell (100), thereby electrically connected to the cylindrical battery cell (100). In other words, the second current collecting plate (240) is mounted on the lower part of the module housing (210) to form an electrically-connected structure with the second electrode terminal (112) of the cylindrical battery cell (100). At this moment, one surface of the second current collecting plate (240) and the other surface of the bus bar (250) may be coupled by laser welding.

The first current collecting plate (230) may include a first current collecting part (231) and a contact receiving part (233).

Here, the first current collecting part (231) may be configured to contact with an upper surface of the bus bar 250 (or, the body plate 251), which is in contact with and is connected to the first electrode terminal (111) of the cylindrical battery cell (100). Also, the first current collecting part (231) is formed to have a weld opening (234) exposing the terminal connection part (256) of the bus bar (250). The contact receiving part (233) may be formed such that at least a part of one side of the first current collecting part (231) is extended toward the front and a stepped structure (232) may be formed in the bottom direction. For example, as shown in FIG. 7, the contact receiving part (233) may be formed such that an entire portion of one side of the first current collecting part (231) is extended toward the front in order to decrease an electrical resistance.

The second current collecting plate (240) may include a second current collecting part (241), a vertical extension part (243) and a contact connection part (245).

Here, the second current collecting part (241) may be configured to contact with a bottom surface (body plate) of the bus bar (250), which makes contact and is connected to the second electrode terminal (112) of the cylindrical battery cell (100). Also, the second current collecting part (241) is formed to have a weld opening (244) exposing the terminal connection part (256) of the bus bar (250).

Also, the vertical extension part (243) may be an extension structure vertically bent in the upward direction from one side of the second current collecting part (241). Further, in the vertical extension part (243), through holes (247, 248) may be formed at locations corresponding to the coupling protrusion (261, 262) so that the coupling protrusion (Items 261, 262 in FIGS. 2 and 3) of the guide coupling structure (260) is penetrated into the through holes. For example, as shown in FIG. 8, four through holes (247, 248) may be formed on the vertical extension part (243).

Further, the contact connection part (245) may have a structure backwardly bent and extended from an upper end of the vertical extension part (243), thereby placed on the contact receiving part (233) of the first current collecting plate (230) and electrically connected to the first current collecting plate (230).

Further, the second current collecting part (241), the vertical extension part (243) and the contact connection part (245) may be integrally formed with one material. That is, when manufacturing the second current collecting plate (240), a portion of the conductive plate is formed as the second current collecting part (241) and, the rest of the conductive plate is vertically bent in the upward direction to form the vertical extension part (243) and, an end portion of the vertical extension part (243) is horizontally bent in the backward direction to form the contact connection part (245).

Figure 9:
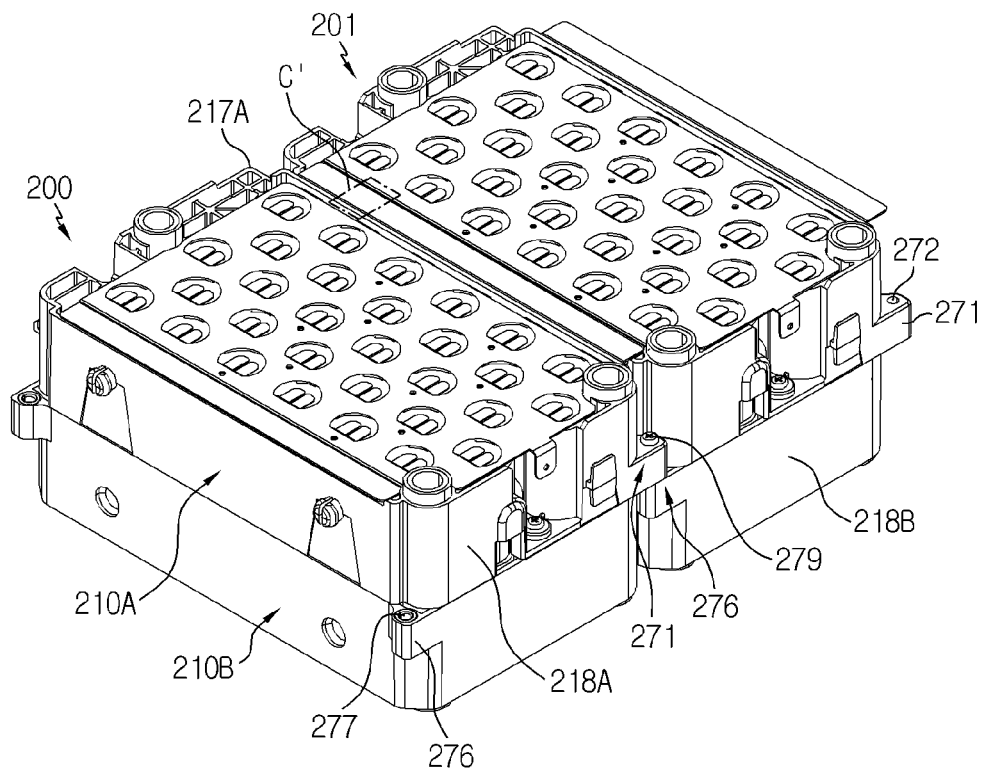
FIG. 9 is a perspective view schematically showing the connected structures of the battery modules according to the embodiment of the present invention.
Figure 10:
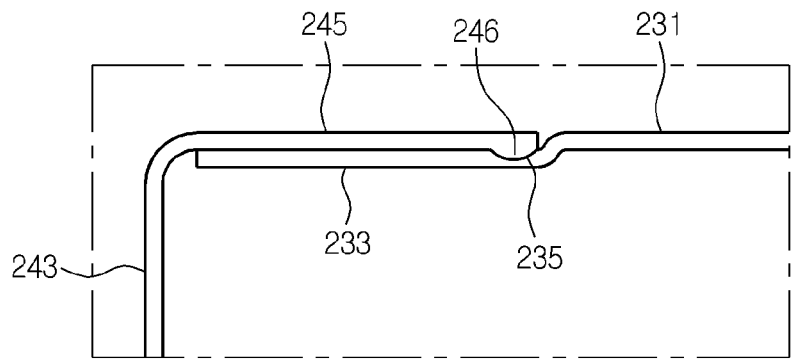
FIG. 10 is a sectional view schematically showing a portion of configurations of the battery module in a region C' of FIG. 9.

FIG. 9 is a perspective view schematically showing the connected structures of the battery modules according to the embodiment of the present invention and FIG. 10 is a sectional view schematically showing a portion of configurations of the battery module in a region C' of FIG. 9.

First, referring to FIG. 10 along with FIGS. 7 to 9, at least one protrusion (246) in the lower direction may be formed on the bottom surface of the contact connection part (245) of the second current collecting plate (240), and at least one receiving groove (235) with a corresponding shape to the protrusion (246) may be formed on the contact receiving part (233).

The protrusion (246) of the contact connection part (245) in the second current collecting part plate (240) may be inserted and fixed in the receiving groove (235) of the contact receiving part (233) in the first current collecting part plate (230).

According to the embodiment of the present invention, the protrusion (246) of the contact connection part (245) may be coupled with the receiving groove (235) of the contact receiving part (233) and thus not only the contact connection part (245) may be easily placed on the contact receiving part (233), but also the contact surface may be effectively enlarged to reduce an electrical resistance while increasing reliability of the electrical connection.

Further, on the contact receiving part (233) of the first current collecting part plate (230), a welding line may be formed to increase convenience of welding with the contact connection part (245) of the second current collecting plate (240).

Again referring to FIGS. 2, 3 and 9, the upper case (210A) may include a first protrusion fastening part (271) and, the lower case (210B) may include a second protrusion fastening part (276).

Here, the first protrusion fastening part (271) may be protruded and extended in the forward or backward direction from an outer surface of the third external wall (217A) and the fourth external wall (218A) of the upper case (210A), and the first protrusion fastening part (271) has a through hole (272) into which a fastening bolt (279) may be inserted. For example, as shown in FIG. 3, two first protrusion fastening parts (271) may be protruded and extended in the backward direction from the outer surface of the third external wall (217A) and the fourth external wall (218A) of the upper case (210A).

As shown in FIG. 2, the second protrusion fastening part (276) may be protruded and extended in the forward or backward direction from an outer surface of the third external wall (217B) and the fourth external wall (218B), and the second protrusion fastening part (276) has a through hole (277) into which the fastening bolt (279) may be inserted. For example, as shown in FIG. 2, two second protrusion fastening parts (276) may be protruded and extended in the backward direction from the outer surface of the third external wall (Item 217B of FIG. 4) and the fourth external wall (218B) of the lower case (210B).

Here, the through hole (277) of the second protrusion fastening part (276) may be communicated with the through hole (272) of the first protruding fastening part (271) in the upper case (210A) of another battery module (200) so that the fastening bolt (279) may be inserted consecutively into the through hole (272, 277). Therefore, the fastening bolt (279) may be inserted and fastened in both the first protrusion fastening part (271) and the second protrusion fastening part (276).

According to the embodiment of the present invention, the first protrusion fastening part (271) of the upper case (210A) may be fastened and coupled by a bolt with the second protrusion fastening part (276) in the lower case (210B) of another battery module (200), thereby preventing a collapse of the arrangement of the battery modules (200), and especially, preventing the electrical connection between the first current collecting plate (230) and the second current collecting plate (240) from being disconnected. In contrast to the present invention, in order to connect and couple a plurality of battery modules by using a conventional technology, a plurality of battery modules must be separated by a predetermined distance due to a volume occupation of a coupling structure. However, the battery module of the present invention includes the first protrusion fastening part (271) and the second protrusion fastening part (276) which are extended at a different heights so as to face each other in a vertical direction. Thus, while minimizing the volume occupation of the coupling structure, a plurality of battery modules of the present invention may be easily coupled and connected to each other. This has advantages of increasing the energy density of the battery modules, and decreasing an installation time.

Referring back to FIG. 5 again, the first receiving part (212A) of the upper case (210A) may be formed to have a fixing structure, which fixes the cylindrical battery cell by applying pressure to the side surface of the cylindrical battery cell (100), on the interior surface facing the side surface of the cylindrical battery cell (100).

Here, the fixing structure may, in order to apply pressure to the outer surface of the cylindrical battery cell (100) from the interior surface of the first receiving part (212A), be a convex part (213) protruding in the horizontal direction (inward direction) toward the position of the cylindrical battery cell (100).

According to the embodiment of the present invention, the fixing structure may effectively reduce not only a defective connection between the cylindrical battery cell (100) and the bus bar (250) caused by an external shock which results in vibration or movement of the cylindrical battery cell (100) but also the damage of the cylindrical battery cell (100).

The first receiving part (212A) of the upper case (210A) may have an incision part (214) which is formed by cutting off the interior wall of the hollow structure from a top end of the hollow structure to a predetermined point in the lower direction. An open gap (S) may be formed at both side of the incision part (214) in the hollow structure of the first receiving part (212A). Here, the convex part (213) may be formed in the center of the incision part (214).

Further, the incision part (214) may be formed at a corresponding location to the incision part (214) of another hollow structure of the first receiving part (212A) and the incision part (214) may be separated by a predetermined distance from the incision part (214) of another hollow structure.

According to the embodiment of the present invention, the incision part (214) may allow the convex part (213) to elastically pressurize the outer surface of the cylindrical battery cell (100) so that the cylindrical battery cell may be easily inserted into the first receiving part (212A) and the convex part may apply a constant pressure to the outer surface of the cylindrical battery cell (100).

Figure 11:
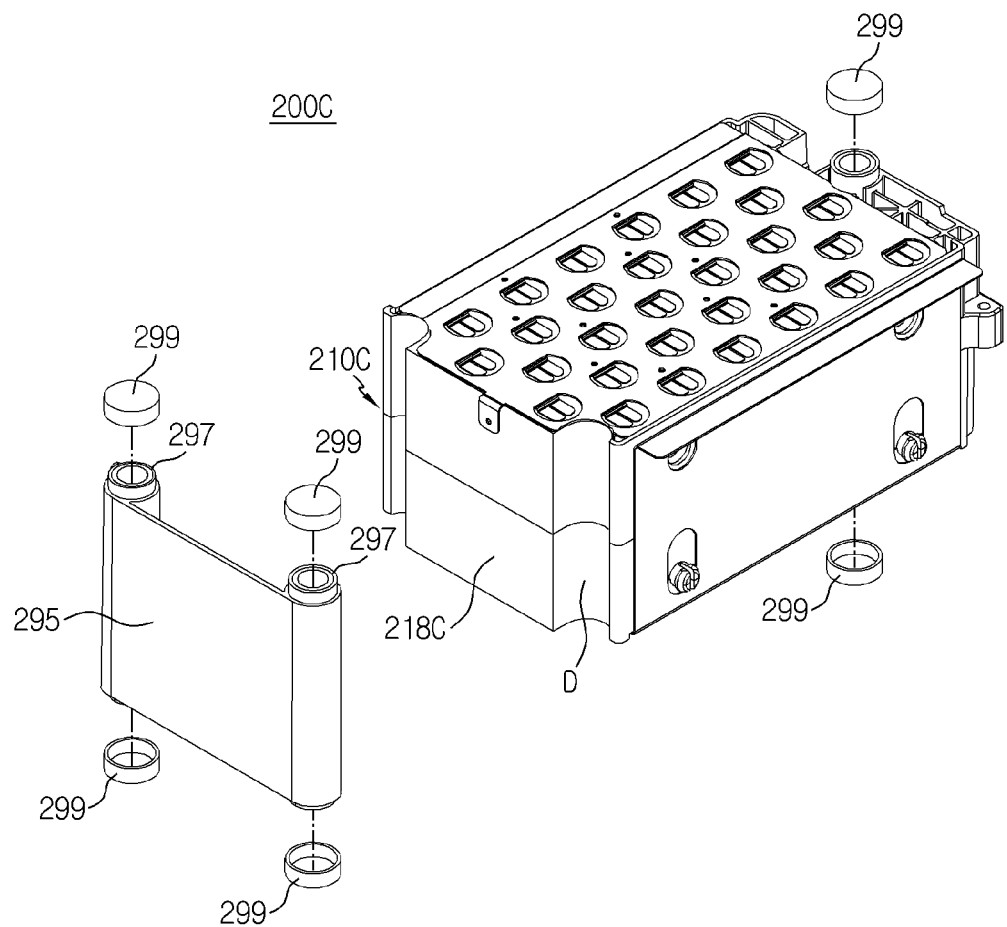
FIG. 11 is an exploded perspective view for a portion of the battery module according to another embodiment of the present invention.
Figure 12:
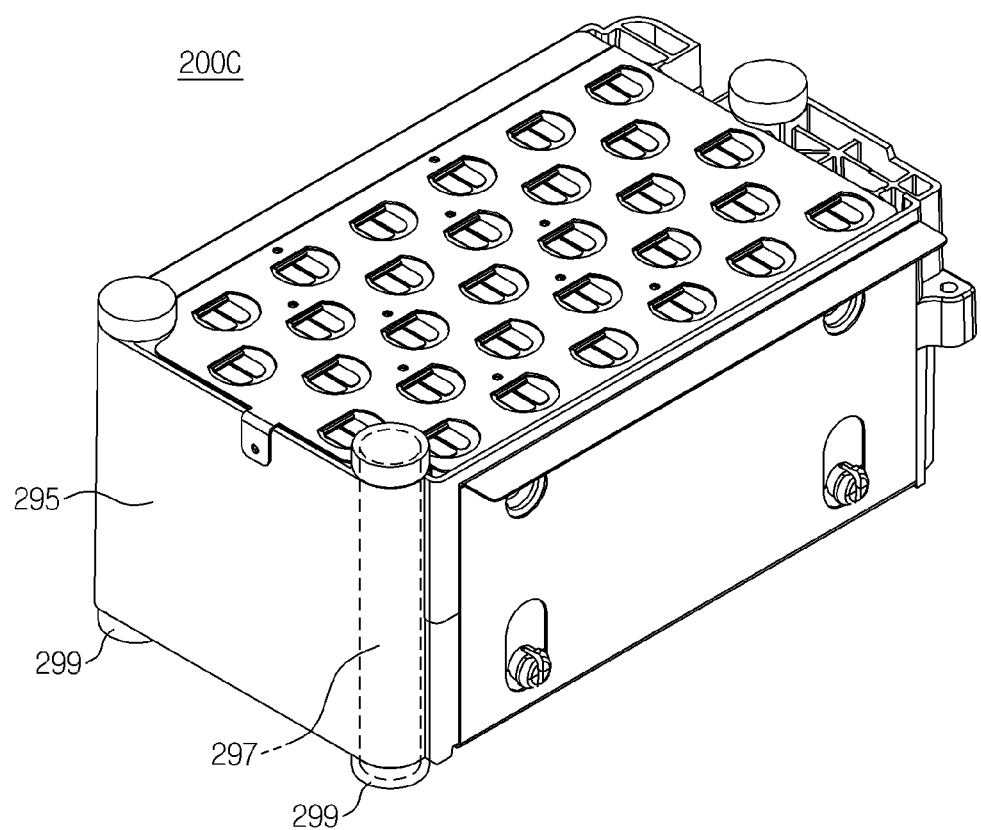
FIG. 12 is a perspective view of the battery module in FIG. 11 when the exploded parts are coupled with each other.

FIG. 11 is an exploded perspective view for a portion of the battery module according to another embodiment of the present invention and FIG. 12 is a perspective view of the battery module in FIG. 11 when the exploded parts are coupled with each other.

Referring to FIGS. 11 and 12, the battery module (200C) according to another embodiment may include an insulation plate (295), a support bar (297) and a fastening member (299).

Specifically, the insulation plate (295) may be positioned to be in contact with an outer surface of an external wall (218C) of a module housing (210C).

The support bar (297) may be inserted into the interior of the insulation plate (295) and may be shaped to protrude outside in the upper and the lower direction from the insulation plate (295).

The fastening member (299), with the support bar (297), may be configured to be fastened to the external wall (218C) of the module housing (210C).

A recessed groove (D) may be formed at one side of an outer surface of the external wall (218C) of the module housing (210C). The recessed groove (D) is inwardly recessed and extended in the upper and lower direction. The support bar (297) inserted into the insulation plate (295) may be inserted and fixed in the recessed groove (D).

Figure 13:
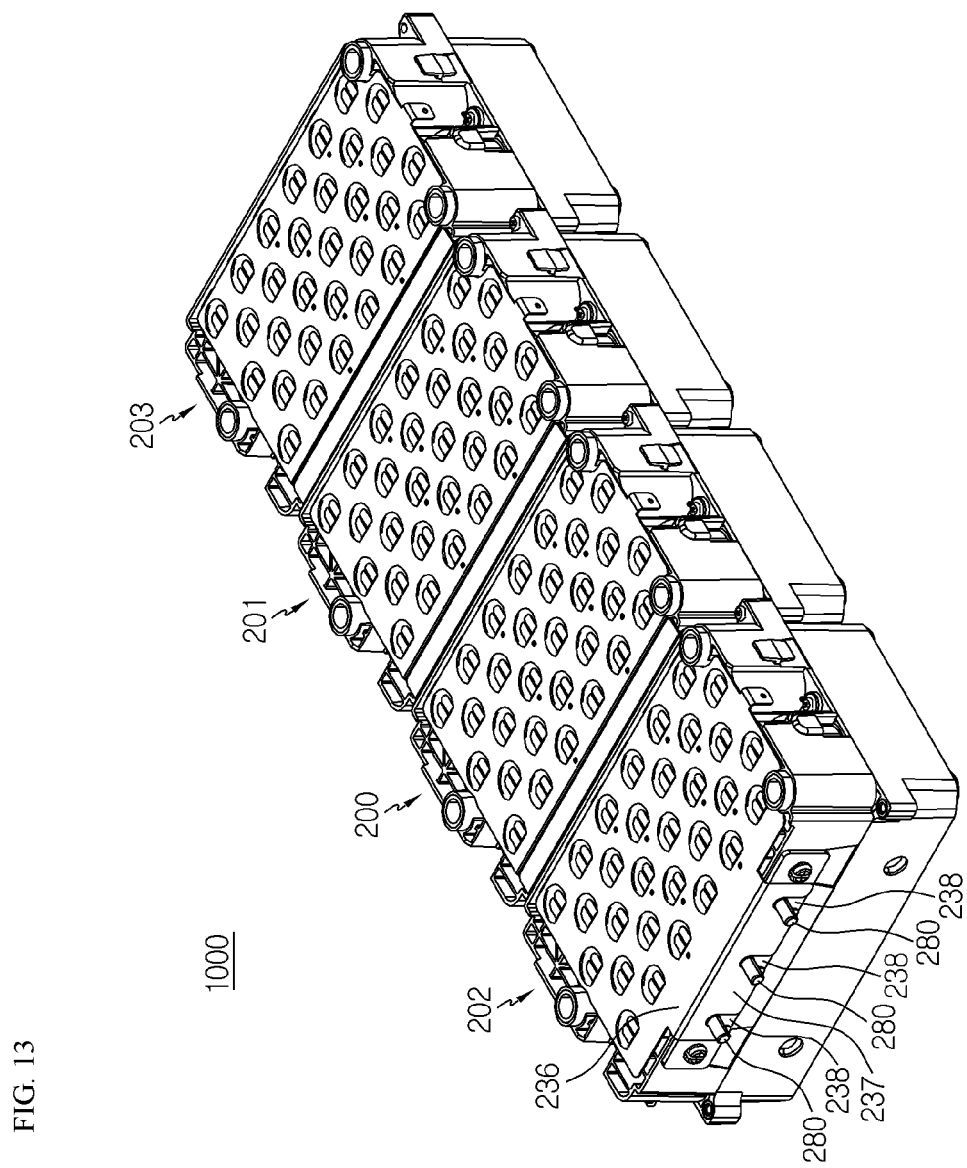
FIG. 13 is a perspective view schematically showing a battery pack according to one embodiment of the present invention.

FIG. 13 is a perspective view schematically showing a battery pack according to one embodiment of the present invention.

Referring to FIG. 13, a battery pack (1000) according to the present invention may include at least two battery modules (200). Specifically, at least two or more battery modules (200, 201, 202, 203) may be arranged and aligned in one direction. For example, as shown in FIG. 13, the four battery modules (200, 201, 202, 203) are linearly arranged in the front and backward direction and then electronically connected in series to each other.

The battery module (202) may include the third current collecting plate (236) comprising an external terminal contact part (237) which is bent in the downward direction, thereby to electrically contact and be connected to an external input/output terminal (280).

The external terminal contact part (237) may include a connection groove (238) which is inwardly recessed from one end of the external terminal contact part (237). The external input/output terminal (280) with a bolt structure may be inserted into the connection groove (238). For example, as shown in FIG. 13, three connection grooves (238) may be formed in the external terminal contact part (237) of the third current collecting plate (236) and three external input/output terminals (280) may be inserted and fixed into the three connection grooves (238).

According to the embodiment of the present invention, the third current collecting part plate (236) may be in electrically contact with the external input/output terminal (280) through the connection groove (238) and thus this may have the advantage of reducing a time in an assembling process.

Figure 14:
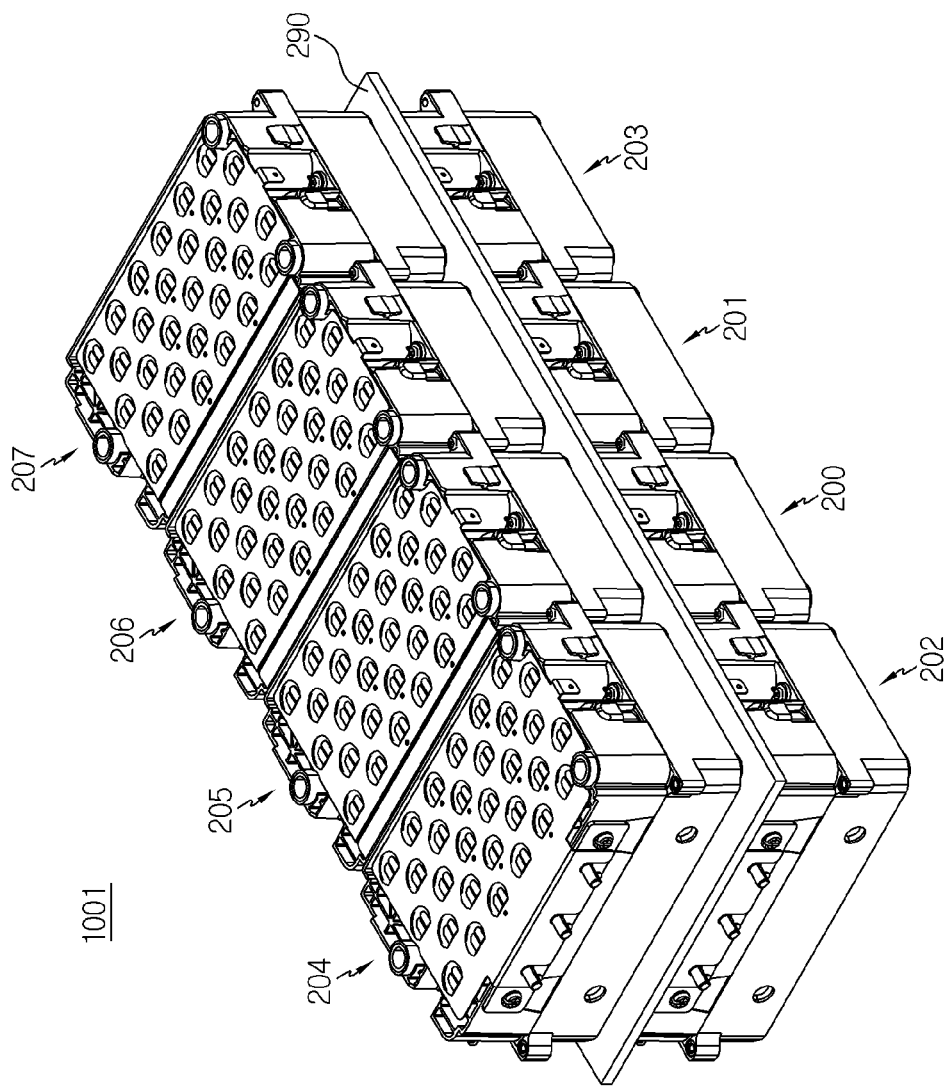
FIG. 14 is a perspective view schematically showing another battery pack according to another embodiment of the present invention.

FIG. 14 is a perspective view schematically showing another battery pack according to another embodiment of the present invention.

Referring to FIG. 14, a battery pack (1001) has at least two or more battery modules (200, 201, 202, 203) arranged and aligned at a first floor in one direction and at least two or more other battery modules (204, 205, 206, 207) stacked on the battery modules (200, 201, 202, 203) and arranged and aligned at a second floor in one direction.

Here, an insulation plate (290) made of an insulating material, e.g., plastic or rubber, with low electrical conductivity, may be disposed between stacked battery modules, including between at least two or more of the battery modules (200, 201, 202, 203) at the first floor and at least two or more of the battery modules (204, 205, 206, 207).

According to the embodiment of the present invention above, the insulation plate (290) may prevent a short circuit from occurring between the battery modules (200, 201, 202, 203) at the first floor and the battery modules (204, 205, 206, 207) at the second floor.

Figure 15:
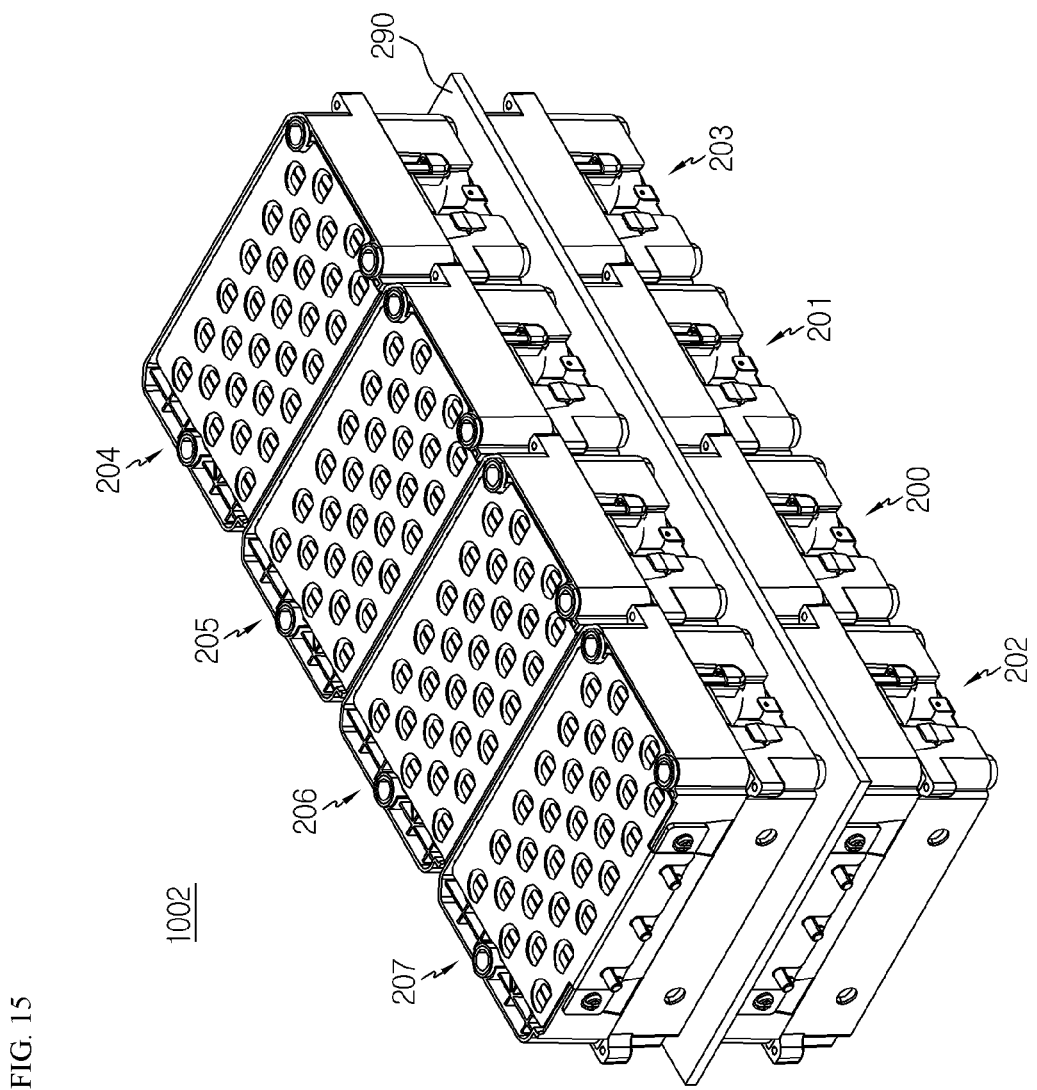
FIG. 15 is a perspective view schematically showing another battery pack according to another embodiment of the present invention.

FIG. 15 is a perspective view schematically showing another battery pack according to another embodiment of the present invention.

Referring to FIG. 15, in a battery pack (1002) according to another embodiment may, as compared to the battery pack (1001) of FIG. 14, the battery modules (204, 206, 206, 207) at the second floor may be vertically reversed so that the first electrode terminal (111) is located below and the second electrode terminal (112) is located above, and then be stacked on the battery modules (200, 201, 202, 203) at the first floor. That is, the first electrode terminal (111) and the second electrode terminal (112) are located at the lower part and the upper part of the battery modules, respectively.

According to the embodiment of the present invention above, the battery modules may be stacked in a various way to form a battery pack and thus this has the advantage of reducing production costs in connection with a change of design to manufacture a new mold.

Referring back to FIG. 13, the battery pack (1000) according to the present invention, apart from the battery module (200), may comprise various devices to control charging and discharging of the battery module (200), for instance, BMS (not shown, battery management system), a current sensor, a fuse and so on.

Also, the battery pack (1000) according to the present invention may be applied in vehicles such as electric vehicles and hybrid vehicles. Thus, a vehicle according to the present invention may comprise the battery pack (1000) according to the present invention.

Furthermore, the battery pack (1000) according to present invention may be used in an energy storage system that may be utilized as an emergency electricity resource. Thus, an energy storage system according to the present invention may comprise the battery pack (1000) according to the present invention.

Meanwhile, in the embodiments above, the terms indicating directions of up, down, left, right, front and back are used but, these terms are for the convenience of explaining and thus it is obvious to an ordinary artisan that the terms may be different depending on the position of the object or the position of the observer.

As above, despite the present invention having been explained by the embodiment and drawings, the present invention is not restricted thereto and a person with an ordinary skill in the art of the present invention may make various modifications and variations within the disclosure of present invention and equivalent scope of the claims.

| [Reference numerals] | |
|---|---|
| 1000, 1001, 1002: battery pack | 250: bus bar |
| 200, 201, 203, 204, 205, 206, 207: battery module | 251: body plate |
| 100: cylindrical battery cell | 256: terminal connection part |
| 111, 112: electrode terminal | 260: guide coupling structure |
| 210, 210C: module housing | 261, 262: coupling protrusion |
| 210A: upper case | 266, 267: guiding groove |
| 210B: lower case | 295: insulation plate |
| 212A, 212B: receiving parts | 297: support bar |
| 230: first current collecting plate | 299: fastening member |
| 233: contact receiving part | |
| 236: third current collecting plate | |
| 240: second current collecting plate | |

INDUSTRIAL APPLICABILITY

The present invention relates to a battery module and a battery pack comprising a plurality of battery modules. Also, the present invention may be used in the energy storage system equipped with the battery module and the battery pack or industries related to vehicles.

What is claimed is:

1. A plurality of battery modules electronically connected to each other, each battery module comprising:
   a plurality of cylindrical battery cells, each battery cell comprising an upper part, a lower part, a first electrode terminal formed on the upper part and a second electrode terminal formed on the lower part;
   a module housing including an accommodating portion having a plurality of hollow structures, wherein the plurality of cylindrical battery cells are provided in the plurality of hollow structures;
   a bus bar including a first surface and a second surface opposite to the first surface, the bus bar contacting and electrically connected to the first or second electrode terminals of at least two cylindrical battery cells among the plurality of cylindrical battery cells through the first surface of the bus bar; and
   a current collecting plate assembly including a first surface and a second surface opposite to the first surface, wherein the current collecting plate assembly is electrically connected, via the first surface of the current collecting plate assembly, to the plurality of cylindrical battery cells by contacting the second surface of the bus bar, and through at least a portion of the second surface of the current collecting plate assembly, is electrically connected to the plurality of cylindrical battery cells of an adjacent battery module among the plurality of battery modules by contacting the current collecting plate assembly of the adjacent battery module,
   wherein each module housing comprises an external wall forming an internal space therein,
   wherein a guide coupling structure, having a coupling protrusion and a guiding groove, is formed on an outer surface of the external wall of the respective module housing so as to guide an arrangement location of the adjacent battery module,
   wherein each current collecting plate assembly comprises:
   a first current collecting plate mounted on an upper part of the module housing and electrically connected to the first electrode terminal of the plurality of cylindrical battery cells of the respective battery module; and
   a second current collecting plate mounted on a lower part of the respective module housing and electrically connected to the second electrode terminal of the plurality of cylindrical battery cells of the respective battery module, and
   wherein each coupling protrusion of each battery module extends through a hole of the respective second current collection plate.

2. The plurality of battery modules according to claim 1, wherein each coupling protrusion is protruded and extended from the outer surface of the respective external wall and each guiding groove is inwardly recessed from the outer surface of the respective external wall, and
   wherein each guiding groove receives the coupling protrusion of the adjacent battery module.

3. The plurality of battery modules according to claim 2, wherein each module housing comprises:
   an upper case including a first receiving part formed in a hollow structure and covering an outer surface of an upper part of the plurality of cylindrical battery cells; and
   a lower case including a top surface coupled to a lower surface of the upper case and a second receiving part formed in a hollow structure and covering an outer surface of a lower part of the plurality of cylindrical battery cells.

4. The plurality of battery modules according to claim 3, wherein each upper case has at least one first protrusion fastening part extending from a respective edge thereof and including a through hole,
   wherein each lower case has at least one second protrusion fastening part extending from a respective edge thereof and including a through hole, and wherein a fastening bolt connects the upper case of a first battery module among the plurality of battery modules to the lower case of a second batter module among the plurality of battery modules by extending through the through hole of the at least one first protrusion fastening part of the first battery module and through the through hole of the at least one second protrusion fastening part of the second battery module, the first battery module being adjacent to the second battery module.

5. The plurality of battery modules according to claim 3, wherein the first receiving part of each upper case comprises a convex part protruded toward an internal direction on an interior surface of the first receiving part, the convex part opposing the plurality of cylindrical battery cells and fixing the plurality of cylindrical battery cells by applying pressure to the plurality of cylindrical battery cells.

6. The plurality of battery modules to claim 5, wherein the first receiving part, of each upper case comprises an incision part cut off from an upper end to a predetermined location of the hollow structure in the lower direction, and
wherein each convex part is formed on an inside surface of the incision part.

7. The plurality of battery modules according to claim 6, wherein each incision part, is correspondingly located with the incision part of the adjacent battery module, and the adjacent incision parts are separated by a predetermined distance.

8. The plurality of battery modules according to claim 1, wherein each bus bar comprises:
a body plate extended in an arrangement direction of the plurality of cylindrical battery cells; and
terminal connection parts protruded and extended from a first end of the body plate, each terminal connection part contacting the first or second electrode terminals of a respective one of the plurality of cylindrical battery cells.

9. The plurality of battery modules according to claim 1, wherein the first current collecting plate of each battery module comprises:
a first current collecting part contacting an upper surface of the bus bar connected to the first electrode terminal of the plurality of cylindrical battery cells; and
a contact receiving part extending toward a front direction from a first end of the first current, collecting part and having a stepped part in a lower direction, and
wherein the second current collecting plate further comprises:
a second current collecting part contacting a lower surface of the bus bar connected to the second electrode terminal of the plurality of cylindrical battery cells;
a vertical extension part extending vertically in an upper direction from a first end of the second current collecting part along an entire length of the second current collecting part, the upper direction being perpendicular to the front direction; and
a contact connection part contacting the contact receiving part of the first current collecting plate and bent and extended in a rear direction from an entirety of an upper end of the vertical extension part, the rear direction being opposite to the front direction and the rear direction being perpendicular to the upper direction, wherein the contact connection part is electrically connected to the first current collecting plate.

10. The plurality of battery modules according to claim 9, wherein each contact receiving part includes at least one protrusion extending downwardly from a bottom surface of each contact receiving part, and
wherein each contact connection part includes at least one groove having a shape corresponding to a shape of the protrusion of the respective contact receiving part to connect adjacent battery modules together.

11. A battery pack comprising the plurality of battery modules according to claim 1, the battery modules being arranged in one direction.

12. A vehicle comprising the battery pack according to claim 11.

13. A plurality of battery modules electronically connected to each other, each battery module comprising:
a plurality of cylindrical battery cells, each battery cell comprising an upper part, a tower part, a first electrode terminal formed on the upper part and a second electrode terminal formed on the tower part;
a module housing including a receiving part having a plurality of hollow structures, wherein the plurality of cylindrical battery cells are provided in the plurality of hollow structures;
a bus bar including a first surface and a second surface opposite to the first surface, the bus bar contacting and electrically connected to the first or second electrode terminals of at least two cylindrical battery cells among the plurality of cylindrical battery cells through the first surface of the bus bar;
a current collecting plate assembly including a first surface and a second surface opposite to the first surface, wherein the current collecting plate assembly is electrically connected, via the first surface of the current collecting plate assembly, to the plurality of cylindrical battery cells by contacting the second surface of the bus bar and, through at least a portion of the second surface of the current collecting plate assembly, is electrically connected to the plurality of cylindrical battery cells of an adjacent battery module among the plurality of battery modules by contacting the current collecting plate assembly of the adjacent battery module;
an insulation plate contacting one side outer surface of an external wall of the module housing;
a supporting bar provided in the insulation plate and protruded in upper and tower directions from an outer circumference of the insulation plate; and
a fastening member fastening the current collecting plate with the supporting bar,
wherein the external wall of the each module housing forms an internal space,
wherein a guide coupling structure, having a coupling protrusion and a guiding groove, is formed on an outer surface of the external wall of each module housing so as to guide an arrangement location of the adjacent battery module,
wherein each current collecting plate assembly comprises:
a first current collecting plate mounted on an upper part of the module housing and electrically connected to the first electrode terminal of the plurality of cylindrical battery cells of the respective battery module; and
a second current collecting plate mounted on a lower part of the respective module housing and electrically connected to the second electrode terminal of the plurality of cylindrical battery cells of the respective battery module, and wherein each coupling protrusion of each batter module extends through a hole of the respective second current collection plate.

14. The plurality of battery modules according to claim 13, wherein a recessed groove, inwardly recessed and extended in the upper direction and the lower direction, is formed on one side outer surface of the external wall of each module housing, and the respective supporting bar is inserted and received into the recessed groove.

15. The plurality of battery modules according to claim 9, wherein the hole of each second current collection plate is provided in the vertical extension part of the respective second current collection plate.

16. The plurality of battery modules according to claim 13, wherein the first current collecting plate of each battery module comprises:

a first current collecting part contacting an upper surface of the bus bar connected to the first electrode terminal of the plurality of cylindrical battery cells; and a contact receiving part extending toward a front direction from a first end of the first current collecting part and having a stepped part in a lower direction, and wherein the second current collecting plate further comprises:

a second current collecting part contacting a lower surface of the bus bar connected to the second electrode terminal of the plurality of cylindrical battery cells;

a vertical extension part extending vertically in an upper direction from a first end of the second current collecting part along an entire length of the second current collecting part, the upper direction being perpendicular to the front direction; and a contact connection part contacting the contact receiving part of the first current collecting plate and bent and extended in a rear direction from an entirety of an upper end of the vertical extension part, the rear direction being opposite to the front direction and the rear direction being perpendicular to the upper direction, wherein the contact connection part is electrically connected to the first current collecting plate.

17. The plurality of battery modules according to claim 16, wherein the hole of each second current collection plate is provided in the vertical extension part of the respective second current collection plate.

18. The plurality of battery modules according to claim 13, wherein the one side outer surface of the external wall of each module housing includes a recessed groove, and wherein the support bar is fixed in the respective recessed groove.

* * * * *